United States Patent
Zhang (10) Patent No.: US 11,481,530 B2
(45) Date of Patent: Oct. 25, 2022

(54) EAR-WEARABLE DEVICE SHELL MODELING

(71) Applicant: Starkey Laboratories, Inc., Eden Prairie, MN (US)

(72) Inventor: Tao Zhang, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 237 days.

(21) Appl. No.: 16/685,745

(22) Filed: Nov. 15, 2019

(65) Prior Publication Data

US 2020/0159878 A1 May 21, 2020

Related U.S. Application Data

(60) Provisional application No. 62/768,208, filed on Nov. 16, 2018.

(51) Int. Cl.
| | |
|---|---|
| *G06F 30/20* | (2020.01) |
| *G06N 20/00* | (2019.01) |
| *G06N 3/08* | (2006.01) |
| *H04R 1/10* | (2006.01) |
| *G06F 119/18* | (2020.01) |

(52) U.S. Cl.
CPC ............ *G06F 30/20* (2020.01); *G06N 3/084* (2013.01); *G06N 20/00* (2019.01); *H04R 1/1058* (2013.01); *G06F 2119/18* (2020.01); *H04R 2201/105* (2013.01)

(58) Field of Classification Search
CPC ..... G06F 30/20; G06F 2119/18; G06N 20/00; G06N 3/084; H04R 1/1058; H04R 2201/105
See application file for complete search history.

(56) References Cited

U.S. PATENT DOCUMENTS

| | | | |
|---|---|---|---|
| 7,605,812 | B2 | 10/2009 | Mcbagonluri et al. |
| 8,032,337 | B2 | 10/2011 | Deichmann et al. |
| 10,032,463 | B1 | 7/2018 | Rastrow et al. |
| 2002/0085728 | A1 | 7/2002 | Shennib et al. |
| 2003/0123685 | A1 | 7/2003 | Basseas |
| 2007/0189564 | A1 | 8/2007 | Mcbagonluri et al. |
| 2015/0271607 | A1 | 9/2015 | Sabin |

(Continued)

FOREIGN PATENT DOCUMENTS

| | | |
|---|---|---|
| CN | 106465025 A | 2/2017 |
| EP | 1345470 A2 | 9/2003 |
| EP | 1939776 A2 | 7/2008 |

(Continued)

OTHER PUBLICATIONS

Unal, G., Nain, D., Slabaugh, G., & Fang, T. (2011). Generating shapes by analogies: An application to hearing aid design. Computer-Aided Design, 43(1), 47-56. (Year: 2011).*

(Continued)

*Primary Examiner* — Bijan Mapar
(74) *Attorney, Agent, or Firm* — Shumaker & Sieffert, P.A.

(57) ABSTRACT

A computing device is described that obtains a representation of a target ear canal of a user. Using a machine-learned model that has been trained based at least in part on representations of previously fabricated ear-wearable devices, the computing device generates a representation of an ear-wearable device for the target ear canal.

23 Claims, 5 Drawing Sheets

(56) References Cited

U.S. PATENT DOCUMENTS

2020/0074662 A1* 3/2020 Williams ............. H04R 1/1016

FOREIGN PATENT DOCUMENTS

| EP | 1368986 B1 | 12/2011 |
|---|---|---|
| EP | 2834750 B1 | 12/2017 |
| WO | 2002071794 A1 | 9/2002 |
| WO | 2006117408 A2 | 11/2006 |

OTHER PUBLICATIONS

Paulsen, R. R., Nielsen, C., Laugesen, S., & Larsen, R. (May 2004). Using a shape model in the design of hearing aids. In Medical Imaging 2004: Image Processing (vol. 5370, pp. 1304-1311). International Society for Optics and Photonics. (Year: 2004).*

Slabaugh, G., Fang, T., McBagonluri, F., Zouhar, A., Melkisetoglu, R., Xie, H., & Unal, G. (2008). 3-D shape modeling for hearing aid design [Applications Corner], IEEE Signal Processing Magazine, 25(5), 98-102. (Year: 2008).*

International Search Report and Written Opinion of International Application No. PCT/US2019/061807, dated Feb. 20, 2020, 15 pp.

Unal et al., "Customized Design of Hearing Aids Using Statistical Shape Learning," International Conference on Financial Cryptography and Data Security, Computer Science, vol. 5241, Springer, Berlin, Sep. 6, 2008, 9 pp.

Paulson, "Statistical Shape Analysis of the Human Ear Canal with Application to In-the-Ear Hearing Aid Design," XP-002673486, Technical University of Denmark, Informatics and Mathematical Modelling, accessed from http://www2.imm.dtu.dk/pubdb/views/edoc_download.php/3196/pdf/imm3196.pdf, Dec. 31, 2004, 197 pp.

Sickel et al., "Toward Automation in Hearing Aid Design," Computer-Aided Design, vol. 43, Issue 12, Dec. 2011, 25 pp.

First Office Action and Search Report, and translation thereof, from counterpart Chinese Patent Application No. 201980075394.8 dated Jan. 14, 2022, 20 Pages.

Translation of the Notice of Intent to Grant from counterpart Chinese Application No. 201980075394.8 dated Jul. 19, 2022, 4 pp.

Translation of the Second Office Action and Search Report, and translation thereof, from counterpart Chinese Application No. 201980075394.8 dated Jun. 8, 2022, 19 pp.

* cited by examiner

EAR-WEARABLE DEVICE SHELL MODELING

This application claims the benefit of U.S. Provisional Patent Application 62/768,208, filed Nov. 16, 2018, the entire content of which is incorporated by reference.

TECHNICAL FIELD

This disclosure relates to ear-wearable devices.

BACKGROUND

An ear-wearable device is a device designed to be worn on or in a user's ear. Example types of ear-wearable devices include hearing aids, earphones, earbuds, telephone earpieces, and other types of devices designed to be worn on or in a user's ear.

Some ear-wearable device manufacturers rely on highly-skilled operators to design ear-wearable devices using three-dimensional modeling software. When an ear-wearable device is produced, these highly-skilled operators and/or audiologists may make physical modifications to outer shells of the ear-wearable devices, for example, to ease user discomfort or otherwise shape the outer shells based on manufacturer or clinician needs. Manual modeling and shaping ear-wearable devices in this way is time consuming, expensive, and can lead to inconsistencies, e.g., due to variations in operator skill level and techniques.

SUMMARY

In general, this disclosure describes techniques for enabling a computing device to use machine-learning techniques to automatically model, based on a raw ear impression of a target ear canal, an ear-wearable device or shell that has similar properties as an ear-wearable device that has been created manually, by a highly-skilled operator.

In one example, a method is described that includes obtaining, by at least one processor, a representation of a target ear canal of a user. The method further includes generating, using a machine-learned model that has been trained based at least in part on representations of previously fabricated ear-wearable devices, a representation of an ear-wearable device for the target ear canal.

In another example, a computing device is described comprising at least one processor configured to obtain a representation of a target ear canal of a user. The at least one processor is further configured to generate, using a machine-learned model that has been trained based at least in part on representations of previously fabricated ear-wearable devices, a representation of an ear-wearable device for the target ear canal.

In another example, a computer-readable storage medium is described that includes instructions, that when executed by at least one processor, configured the at least one processor to obtain a representation of a target ear canal of a user. The instructions, when executed, further configure the at least one processor to generate, using a machine-learned model that has been trained based at least in part on representations of previously fabricated ear-wearable devices, a representation of an ear-wearable device for the target ear canal.

In another example, a system is described including means for obtaining a representation of a target ear canal of a user. The system further includes means for generating, using a machine-learned model that has been trained based at least in part on representations of previously fabricated ear-wearable devices, a representation of an ear-wearable device for the target ear canal.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

An ear-wearable device is a device designed to be worn on or in a user's ear. Example types of ear-wearable devices include hearing aids, earphones, earbuds, telephone earpieces, and other types of devices designed to be worn on or in a user's ear. As the term is used herein, an ear-wearable device, such as a hearing assistance device, a hearing device, and a hearing instrument, refers to any ear-wearable device that is used as a hearing aid, a personal sound amplification product (PSAP), a headphone set, a hearable, a wired or wireless earbud, or other hearing instrument that provides sound to a user for hearing.

Some ear-wearable device professionals take ear impressions of patients or end-users and send the raw impressions and/or scans of the raw impressions, along with other patient-specific requirements (e.g., style, features, etc.), to an ear-wearable device manufacturer facility. A highly-skilled operator (e.g., a production modeler, audiologist, etc.) at the manufacturing facility may scan the raw impressions or import the scanned impressions into three-dimensional modeling software.

Based on the patient-specific requirements and a set of empirical modelling guidelines known to the operator, the operator may manually design an ear-wearable device, for instance, by interacting with the modeling software to create a computer model of an outer shell that can contain all the internal components (e.g., microphones, receiver, circuits, vent, etc.) of the ear-wearable device and fit comfortably inside a particular user's ear. Even with the assistance of three-dimensional modeling software, a skilled operator may spend anywhere from five to fifteen minutes manually creating a model of an outer shell. Once the operator is satisfied with a shell design, an ear-wearable device is manufactured, based on the shell design. Afterwards, the operator at the manufacturing facility and/or an ear-wearable device professional at a clinic or retail location, may spend additional time further modifying the outer shell of the ear-wearable device (e.g., using hand tools) to minimize any actual, or foreseen, end-user discomfort.

Manual modeling and shaping ear-wearable devices in this way is time consuming, expensive, and can lead to inconsistencies, e.g., due to variations in operator skill level and operator techniques. If an end-user or professional would like to preview their custom, ear-wearable design before manufacturing, the clinic or retailer must have access to a dedicated modeler, expensive modeling software, and at least five to fifteen minutes of the modeler's time. Furthermore, for custom ear-wearable devices, such as over-the-counter hearing aids and such, costs and time associated with relying on highly-skilled and/or dedicated operators to manually create ear-wearable designs may not be feasible from a business stand point and may inject delays in the procurement of ear-wearable devices, which may be unacceptable to a retailer, professional, or end-user.

In general, this disclosure describes techniques for enabling a computing device to use machine-learning techniques to automatically model ear-wearable devices that have similar properties as finished, ear-wearable devices that have been created manually, by a highly-skilled operator and/or clinician. For example, some ear-wearable device manufacturers, and clinicians, have over time, accumulated hundreds of thousands if not millions of raw ear impressions and corresponding data associated with finished, ear-wearable device products. The data may span a variety of ear-wearable device styles and other device and/or end-user characteristics. Rather than manually create ear-wearable devices using highly-skilled operators and time-consuming modeling software, a machine-learned model can be trained, using the accumulated ear impressions and corresponding data associated with finished ear-wearable devices, to output ear-wearable device designs that mimic the finished, ear-wearable devices created by skilled modelers and clinicians.

Figure 1:
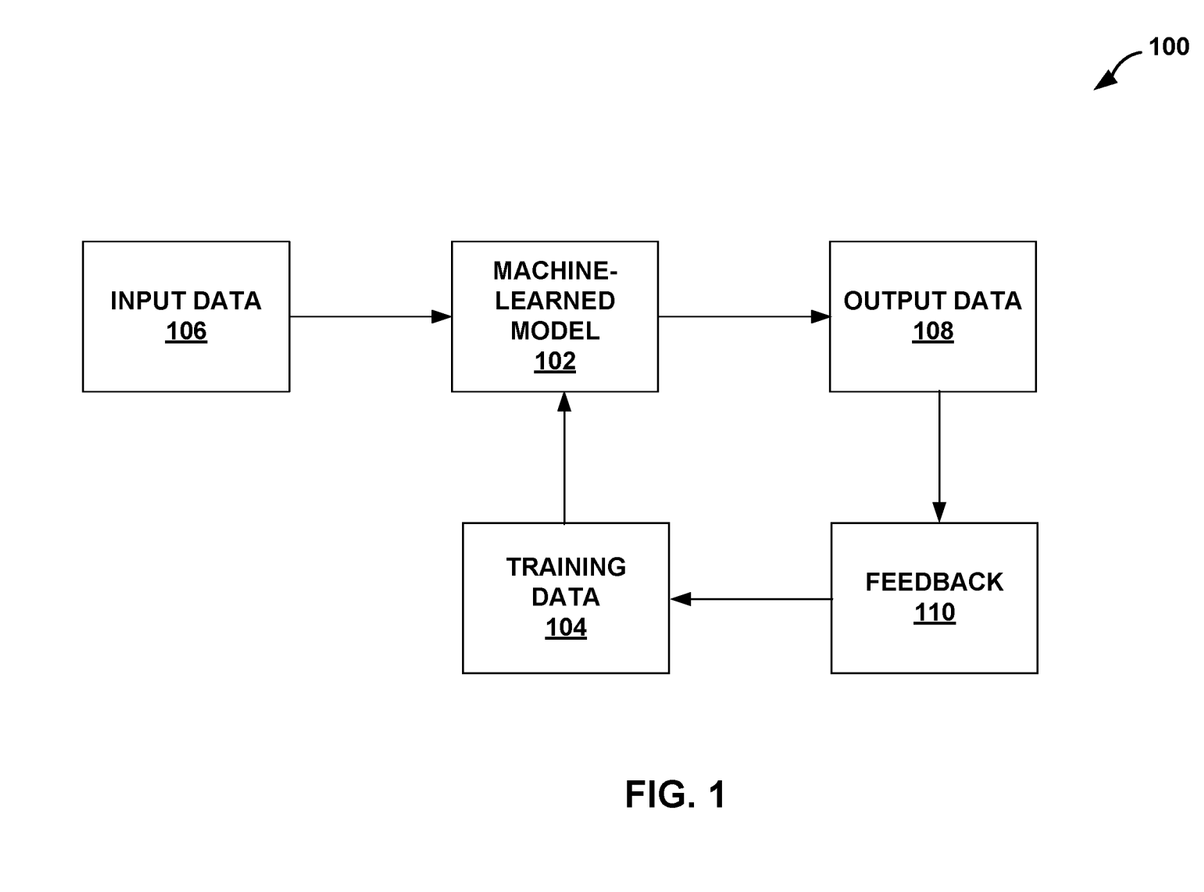
FIG. 1 is a conceptual diagram illustrating an example machine-learning system, in accordance with one or more aspects of the present disclosure.

FIG. 1 is a conceptual diagram illustrating an example machine-learning system, in accordance with one or more aspects of the present disclosure. System 100 of FIG. 1 is configured to automatically model ear-wearable devices that have similar properties as finished, ear-wearable devices that have been created manually, by highly-skilled operators working in manufacturing facilities or in clinics or other retail establishments.

System 100 may execute on one or more processors of a computing device or computing system. For example, system 100 may execute on at least one processor of a computer workstation located at an ear-wearable device manufacturing facility. In other examples, system 100 may execute on at least one processor of a computer work station located at a clinic or other retail facility that fits and sells ear-wearable devices to patients and other end users. In some cases, system 100 may execute in a cloud computing environment, and may be accessed remotely via a computer workstation located at a manufacturing facility, clinic, or other retail facility. Still in other examples, system 100 may execute as part of an application executing on at least one processor of a mobile computing device associated with a patient or other end user.

System 100 includes machine-learned (ML) model 102. ML model 102 is configured to generate, as output data 108, a representation of an ear-wearable device for a target ear canal of a user. ML model 102 is configured to generate representations of ear-wearable devices that mimic finished, ear-wearable devices produced by highly-skilled operators at manufacturing facilities, clinics, and other retail facilities. That is, ML model 102 is trained to produce representations of ear-wearable devices that have a shape and configuration that is as close as possible to a shape and configuration of ear-wearable devices that have been physically modified by highly skilled operators at manufacturing, clinician, or retail facilities.

ML model 102 can be or can include one or more of various different types of machine-learned models. For example, ML model 102 may include one or more neural networks, deep-neural networks, parametric models, or other types of machine-learned models. Other examples of such different types of machine-learned models are provided in the description of FIG. 2 in the description of machine-learned (ML) model 202.

ML model 102 is trained using training data 104. Many examples of training data 104 exist. As one example, training data 104 may include representations of previously fabricated ear-wearable devices and representations of corresponding ear impressions used to produce the previously fabricated ear-wearable devices.

For example, clinicians or sales persons at retail facilities may have, over time, taken hundreds if not thousands of three-dimensional impressions of target ear canals for end users and sent those ear impressions, or scans thereof, to ear-wearable device manufacturers. After highly-skilled operators import the ear impressions into three-dimensional modeling software and use hand tools to create finished, ear-wearable devices, the clinician, retailer, or manufacturer may have recorded the dimensions and overall characteristics of the finished, ear-wearable devices that end up being worn by end users.

Training data 104 may include representations of the ear impressions taken over time and representations of finished, ear-wearable devices that correspond to the ear impressions. Said differently, training data 104 may include representations of actual ear impressions taken over time as example input data and may include, as desired output data, representations of finished, ear-wearable devices that correspond to the example input data. In this way, ML model 102 may infer, from training data 104, design rules and constraints to abide by when ML model 102 generates, for a particular target ear canal, a representation of an ear-wearable device such that the representation generated by ML model 102 has a shape and design that mimics a shape and design the ear-wearable device would otherwise have if produced manually, by a skilled operator. In some examples, training data 104 includes other data in addition to historical ear impressions and corresponding final, ear-wearable device characteristics, as described in greater detail with respect to training data (e.g., training data in training data store 204 shown in FIG. 2).

ML model 102 is configured to receive input data 106 and, in response, ML model 102 is configured to provide output data 108. Input data 106 includes information that specifies characteristics of a target ear canal and/or end user. Output data 108 includes a representation of an ear-wearable device that ML model 102 determines more closely matches a shape and design of a finished ear-wearable device that has been created manually, by a skilled operator using modeling software and/or other tools. For example, output data 108 may include a three-dimensional representation of an ear-wearable device shell that closely conforms to areas of a target ear canal with more curvature than other areas of the target ear canal with less curvature. The three-dimensional representation may include positioning information indicative of locations of internal components within the shell.

Examples of input data 106 and output data 108 are provided below. Additional examples of input data 106 and output data 108 are also possible, as described in greater detail with respect to input data (e.g., input data in input data store 206 shown in FIG. 2) and output data (e.g., output data in output data store 208 shown in FIG. 2).

Input data 106 includes a representation of a target ear canal of an end user. The representation of the target ear canal may be a three-dimensional representation of an ear-impression taken of the end user. In other examples, the representation of the target ear canal may be a three-dimensional representation based off an image (e.g., photograph, x-ray, or other type of image) taken of the target ear canal of the end user. In some examples, the representation of the target ear canal may be refined or pretreated in one or more ways before being passed as an input to ML model 102. For example, the representation of the target ear canal may be generated using a Fourier transform or other manipulation of the three-dimensional representation of the ear-impression or image taken of the end user.

In some examples, input data 106 includes an indication of a particular type of ear-wearable device. For example, ML model 102 may follow different design rules and constraints depending on the type of ear-wearable device being generated. Putting another way, ML model 102 may be trained using training data 104 associated with a first type of ear-wearable device and may be further trained using training data 104 which is associated with a second, different type of ear-wearable device. ML model 102 may generate a representation of an ear-wearable device of the first type when input data 106 specifies the first type and ML may generate a second, different representation of an ear-wearable device of the second type when input data 106 specifies the second, different type.

Also referred to as ear-wearable device styles, many examples of ear-wearable device types exist. As some examples, an indication of a particular type of ear-wearable device may specify whether ML model 102 should generate: a hearing assistance device, an earphone, an earbud, a telephone earpiece, or other type of ear-wearable device. With respect to hearing assistance devices, or so-called hearing-aids, hearing devices, or hearing instruments, the indication of the particular type of ear-wearable device may specify whether ML model 102 should generate one of three types of hearing assistance devices.

One type of hearing assistance device includes a housing or shell that is designed to be worn in the ear for both aesthetic and functional reasons. The housing or shell encloses electronic components of the hearing instrument. Such devices may be referred to as in-the-ear (ITE), in-the-canal (ITC), completely-in-the-canal (CIC), or invisible-in-the-canal (IIC) hearing instruments. ML model 102 may be configured to generate a design for the housing or shell that is designed to be worn in the ear as a representation of an ear-wearable device for the target ear canal of an end user.

Input data 106 may further include respective representations of each internal component of the ear-wearable device being designed by ML model 102. The respective representation of each internal component of the ear-wearable device may include a three-dimensional representation (e.g., physical dimensions) of that internal component, or a Fourier transform or other refinement or manipulation of the three-dimensional representation of that internal component.

For example, an ear-wearable device may include several internal components of various size. A final size or shape of an external housing of an ear-wearable device may depend on the size and shape of each internal component of the ear-wearable device. ML model 102 may generate a representation of an ear-wearable device that can accommodate the size and shape of each of the internal components selected to be included in the final design. Examples of internal components of an ear-wearable device are described in greater detail with respect to ear-wearable device 300 shown in FIG. 3A.

Input data 106 may further include an indication of one or more modeling constraints to be followed by ML model 102. Modeling constraints may include quantified parameters derived from empirical modelling guidelines obtained from expert modelers and/or audiologists. In other words, the modeling constraints of input data 106 may specify specific "rules of thumb" derived from skilled operator experience that are converted to quantitative parameters. ML model 102 may be fed with one or more modeling constraints to increase the likelihood that ML model 102 generates representations of ear-wearable devices that will fit an end user's ear, with little to no physical modifications.

As one example of a modeling constraint, input data 106 may include one or more limitations on relative positioning between two or more of the internal components or limitations on positions of one or more of the internal components relative to an outer shell of the ear-wearable device. For example, a minimum separation between a face plate, a receiver, and/or hearing shell may be required to ensure operational stability. Likewise, a receiver may function properly unless positioned at a minimum distance from, or otherwise prevented from contacting, an outer shell of the ear-wearable device.

As another example, input data 106 may include one or more limitations on positions of one or more of the internal components relative to an access panel of the ear-wearable device. For example, a processor or circuit may need to reside adjacent to a faceplate or access panel of the ear-wearable device.

As another example, input data 106 may include one or more limitations on a thickness of the outer shell of the ear-wearable device. For example, while it may be desirable to reduce outer shell wall thickness, e.g., to generate an ear-wearable device that is smaller and lighter in weight, a minimum thickness may be required to promote device integrity and durability.

As another example, input data 106 may specify characteristics of a ear-wearable device. For example, an ear-wearable device may include a vent for receiving sound waves and/or or outputting sound waves. Over the years, skilled operators may have learned that a particular size of the vent may be crucial to ensure good voice sound quality. Input data 106 may include information specifying a minimum cross-sectional area or other dimension of such a vent.

ML model 102 is configured to receive, as a form of training data 104, feedback 110 for retraining ML model 102 based on modifications to output data 108 and the representation of the ear-wearable device for the target ear canal. In other words, the representations of ear-wearable devices generated by ML model 102 may initially include errors or require physical modifications to improve end user comfort. However, over time, by providing ML model 102 with feedback 110 about the errors, ML model 102 can continuously learn and improve so that subsequent representations of ear-wearable devices generated by ML model 102 require little to no physical modifications. Thus, in some examples, ML model 102 may be retrained based on user modifications to the representation of the ear-wearable device for the target ear canal.

As one example, feedback 110 may include specific dimensional changes made by a highly-skilled operator to the outer shell of an ear-wearable device to better fit the ear-wearable device inside a target ear canal of a user. The dimensional changes may include actual dimensional changes, or refinements or manipulations of the dimensional changes. As another example, feedback 110 may include specific positional changes made by a highly-skilled operator to the positioning of internal components within the shell of the ear-wearable device (e.g., to conform to empirical design guidelines). The positional changes may include actual positional changes, or refinements or manipulations of the positional changes.

In some examples, training data 104 includes other data in addition to historical ear impressions and corresponding final, ear-wearable device characteristics. For examples, training data 104 may further include characteristics of corresponding end users of the final, previously fabricated ear-wearable devices. For example, the same clinicians or sales persons at retail facilities who may have, over time, taken hundreds if not thousands of three-dimensional impressions of target ear canals for end users and may have recorded other information about the end users. That is, while taking precautions to protect or omit any personally identifiable information from user data collected over time, a clinician or sales person at a retail facility may have retained characteristics of end users including each of the end users' age, gender, national origin, geographic location, or other personal characteristic. A clinician or sales person at a retail facility may have retained specific information about end users' ears, including information specifying a particular ear type, a particular ear shape, and/or a particular ear or ear-canal size.

ML model 102 may infer, from these users' characteristics, additional design rules and constraints to follow when ML model 102 generates, for a particular target ear canal, a representation of an ear-wearable device. For example, following the rules or constraints may cause ML model 102 to generate a representation of an ear-wearable device that has a shape and design that mimics a shape and design the ear-wearable device would otherwise have, if produced manually, by a skilled operator. For example, ML model 102 may infer that, for a particular end users' age, gender, national origin, geographic location, or other personal characteristic, that ear-wearable devices produced manually, by skilled operators, have a particular shape or design that is unique to that personal characteristic. In some examples, ML model 102 may include multiple models, with each being trained to handle a different age, gender, national origin, geographic location, or other personal characteristic.

In some examples, training data 104 includes characteristics or preferences of certain clinics, retailers, or groups of users. For example, certain clinicians or sales persons may have, over time, developed their own "brand" of devices by adhering to their own specific preferences when it comes to designing custom ear-wearable devices. ML model 102 may be trained to learn these clinician preferences and infer additional design rules and constraints to follow when ML model 102 generates, for a particular clinic or clinician, a representation of an ear-wearable device.

System 100, by executing ML model 102, may reduce the amount of manual, human intervention required to design and model ear-wearable devices, thereby reducing costs and improving overall quality by reducing inconsistencies that might otherwise be observed across different modelers. Executing ML model 102 may not only save human labor and modeler training, but it may also reduce overall shell modeling and modification time by at least several folds, thereby potentially saving costs.

Figure 2:
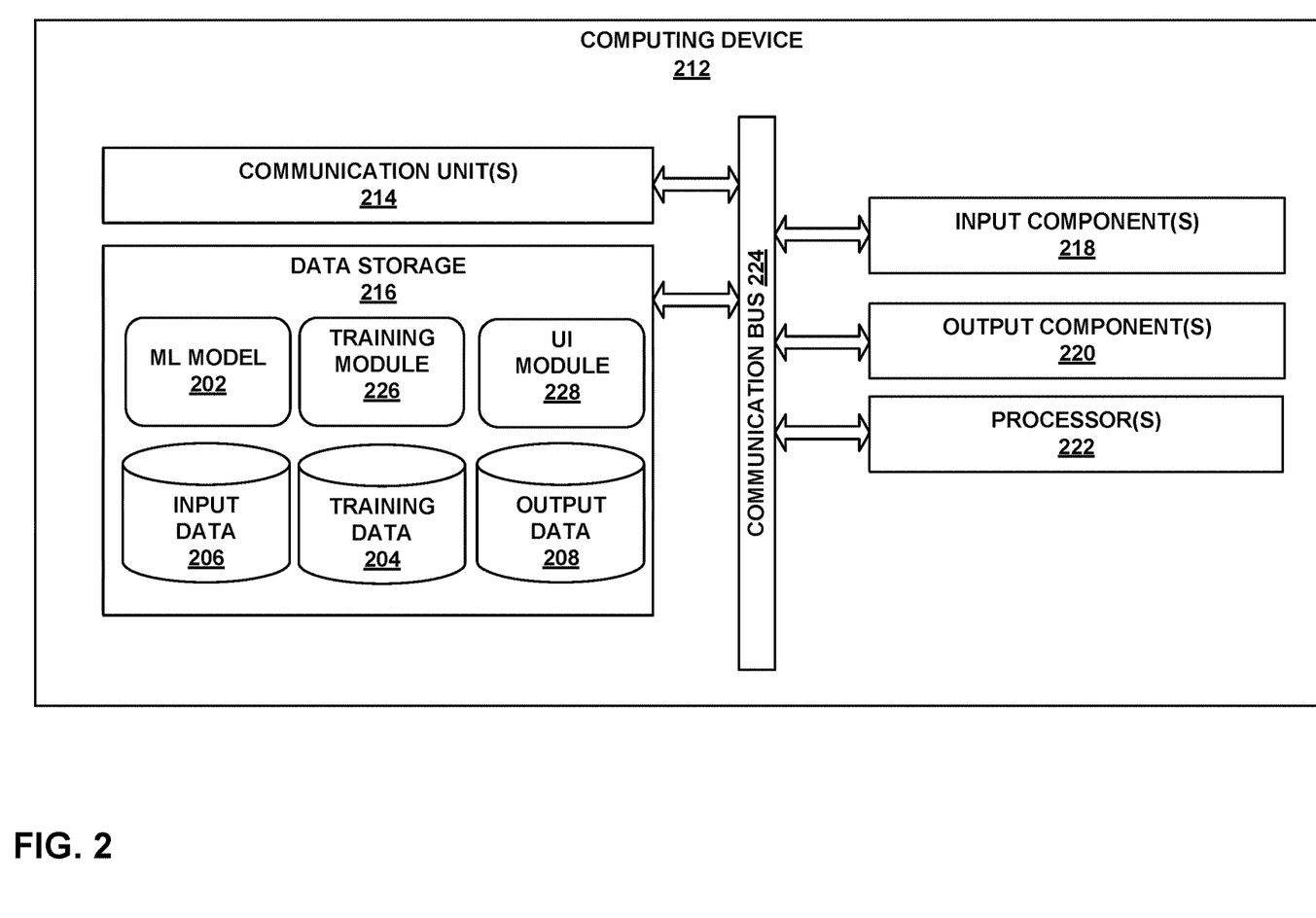
FIG. 2 is a block diagram illustrating an example computing device configured to train and execute a machine-learned model, in accordance with one or more aspects of the present disclosure.

FIG. 2 is a block diagram illustrating an example computing device configured to train and execute a machine-learned model, in accordance with one or more aspects of the present disclosure. Computing device 212 of FIG. 2 is configured to train and/or execute machine-learned (ML) model 202, which is an example of ML model 202 of FIG. 1. FIG. 2 illustrates only one particular example of computing device 212, and many other example configurations of computing device 212 exist.

Computing device 212 may include one or more electronic computing devices including a combination of one or more: mobile devices, wearable devices (e.g., ear-wearable or non-ear-wearable), server devices, or other type of computing devices. Some specific examples of computing device 212 include a combination of one or more of: a mobile phone, a tablet computer, a portable media player device, a standalone server device, a server blade, a personal computer, a work station, a content delivery network device, or another type of device. Thus, in general, descriptions in this disclosure of computing device 212 performing particular actions or functions should be interpreted as a combination one or more electronic computing devices performing the particular actions or functions.

As shown in the example of FIG. 2, computing device 212 includes one or more processors 222, one or more input components 218, one or more communication units 214, one or more output components 220, data storage 216 (e.g., one or more data storage devices), and communication bus 224. Computing device 212 may include many other components.

Communication bus 224 may interconnect (physically, communicatively, and/or operatively) each of components 214, 216, 218, 220, and 222 for inter-component communications. In some examples, communication bus 224 may include a system bus, a network connection, an inter-process communication data structure, or any other method for communicating data.

Computing device 212 may rely on input components 218 to receive user input. Examples of user input include tactile, audible, and visual input. Input components 218 may include presence-sensitive screens, touch-sensitive screens, cameras, mice, trackpads, trackballs, keyboards, microphones, physical buttons, communication ports, sensors, or any other type of component configured to detect input from a human or machine.

Computing device 212 may rely on output components 220 to generate output. Examples of output include tactile, audible, and visual output. Output components 220 may include a display, such as a presence-sensitive screen, liquid crystal displays (LCD), or other type of display, sound cards, video graphics adapter cards, speakers, or any other type of component configured to generate output to a human or machine. In some examples, a single component may span both input components 218 and output components 220, for example, a presence-sensitive screen is an example of both one of input components 218 and one of output components 220.

Communication units 214 may enable computing device 212 to exchange data with one or more other computing devices (e.g., via a communications network, such as a local area network or the Internet). Communication units 214 may include transmitters and receivers that enable computing device 212 to communicate wired or wirelessly with the other computing devices. Examples of communication units 214 may include optical transceivers, radio frequency transceivers, or other types of devices that are able to send and receive information. Other examples of communication units 214 may include Bluetooth radios, cellular data radios, Wi-Fi radios, Thunderbolt or Universal Serial Bus (USB) interfaces, and the like.

Communication units 214 may configure computing device 212 to communicate with remote computing devices that maintain databases or other records of previously fabricated ear-wearable devices. For example, computing device 212 may receive, using communication units 214, from a production facility database, data including representations of previously fabricated ear-wearable devices that are used to train a machine-learned model, such as ML model 202. As another example, computing device 212 may receive, using communication units 214, from a clinician or retail facility database, other data including representations of previously fabricated ear-wearable devices that are used to train a machine-learned model, such as ML model 202.

Computing device 212 includes one or more processors 222 that are configured to read instructions from data storage 216 and execute the instructions to cause computing device 212 to take actions or perform functions. For example, processors 222 may execute instructions that cause computing device 212 to train and execute a machine-learned model, such as ML model 202, in accordance with one or more aspects of the present disclosure.

Data storage 216 may store information, including instructions executed by processors 222, that is required during operational use of computing device 212. In some examples, data storage 216 has the primary purpose of being a short term and not a long-term computer-readable storage medium. Data storage 216 may be volatile memory and may therefore not retain stored contents if computing device 212 is powered off. Data storage 216 may further be configured for long-term storage of information as non-volatile memory space and retain information even if computing device 212 is powered off.

As shown in FIG. 2, data storage 216 includes information associated with ML model 202, training module 226, and user interface (UI) module 228. In addition, data storage 216 includes input data store 206, training data store 204, and output data store 208. Processors 222 may execute instructions associated with ML model 202 and modules 226 and 228 to cause computing device 212 to perform a function.

UI module 228 is configured to manage a user interface associated with computing device 212. Specifically, UI module 228 may provide an interface (e.g., a graphical user interface) from which a user of computing device 212 can interact with ML model 202 to cause ML model 202 to generate representations of ear-wearable devices, based at least in part on representations of target ear canals, in accordance with the techniques of this disclosure. For example, UI module 228 may cause a display screen of output components 220 to provide a graphical or other type of user interface from which a user can view a representation of an ear-wearable device that has been generated by ML model 202. UI module 228 may interpret inputs detected by input components 218 as the user interacts with the user interface, for example, to provide user specific controls to ML model 202. UI module 228 may exchange information with ML model 202 and/or training module 226.

As one example, computing device 212 may be a production workstation that executes production modeling software which includes ML model 202 and modules 226 and 228. UI module 228 may interpret inputs and generate outputs associated with the production modeling software, for example, to enable user control over various parameters of ML model 202. For instance, a user of computing device 212 may provide input detected by input components 218 that cause UI module 228 to perform a function, such as configuring ML model 202 to generate a specific type of ear-wearable device representation with specific components that are selected by the user. A skilled operator at a production facility may make adjustments to ML model 202, for example, based on discussions or information obtained from clinicians or quality control specialists at final assembly or in the field.

As another example, computing device 212 may be a clinician workstation that executes clinician modeling software, similar to the production modeling software mentioned above, however with a focus on addressing clinician's, audiologist, or retailer's requirements as opposed to a production operator's requirements. For example, a user of computing device 212 may provide input detected by input components 218 that cause UI module 228 to perform a function, such as configuring ML model 202 to generate a representation of an ear-wearable device that addresses the specific requirements being dictated to the user by a patient during a consultation in a clinic. A professional in a clinic may therefore be able to interact with computing device 212 to quickly model and visualize, on behalf of a patient or customer, different types of ear-wearable devices so that the professional and customer can make an informed decision before sending in a request to a manufacture to produce the ear-wearable devices.

As another example, computing device 212 may be a mobile device, such as a tablet or mobile phone, that executes a consumer application that enables a user to interact with consumer modeling software which includes (or at least provides access via a cloud) ML model 202 and modules 226 and 228. UI module 228 may interpret inputs and generate outputs associated with the consumer application, for example, to enable an end user to have some control over various parameters of ML model 202. For instance, a user of computing device 212 may provide input detected by input components 218 that cause UI module 228 to perform a function, such as configuring ML model 202 to generate a representation of an ear-wearable device that satisfies general usability characteristics and preferences that have been selected through the consumer application, by the end user. Ear-wearable device users themselves may be able to quickly visualize different types of custom ear-wearable device products without visiting a clinic and make an informed decision to order products from their home or in the field. As such, once a patient or other end user submits to the consumer application an ear impression or scan (e.g., performed at a pharmacy for example) the user can obtain and visualize simulated ear-wearable shell models in only minutes or seconds and make a quick decision about ordering an ear-wearable on the spot and may be assured that the resulted ear-wearable will sound great, look great, and be comfortable to wear.

UI module 228 may write information to input data store 206 and may read information from output data store 208. UI module 228 may further write feedback information to training data store 204, for example, the feedback information may indicate any user changes made to a final ear-wearable device design that was generated by ML model 202.

Training module 226 trains ML model 202 based on information contained at training data store 204. Training module 226 may be configured to continuously train ML model 202, for example, in response to receiving feedback information from UI module 228 or from determining errors in the output from ML model 202. Training module 226 is configured to transition ML model 202 into a training mode where ML model 202 receives example input data and example output data, to cause ML model 202 to create or update any inferences established by ML model 202 previously during previous training sessions. Training module 226 may be configured to train ML model 202 based on records of previously fabricated ear-wearable devices, for example, received using communication units 214, from a production facility database, a clinician or retail facility database, or other repository.

In some examples, training module 226 may determine errors or a deviation between desired outputs used to train ML model 202 and the outputs actually obtained from ML model 202. Training module 226 may apply more emphasis fixing some errors than others. For example, training module 226 may apply higher weights to certain areas of a representation of an ear-wearable device to increase a likelihood that ML model 202 reduces the errors in those areas and apply lower weights to other areas to decrease a likelihood that ML model 202 reduces the errors in those other areas.

For example, a representation of an ear-wearable device may include a set of three-dimensional points that define a shape of the ear-wearable device. Some of the three-dimensional points may be more important (e.g., to ensure user comfort when wearing the ear-wearable device) than others. Training module 226 may determine a deviation in the shape of the ear-wearable device as compared to a desired shape, and apply weights to the more important three-dimensional points where the deviations occur, to cause ML model 202 to more closely match the desired shape, particularly at the more important points.

ML model 202 is an example of ML model 102 of FIG. 1. Like ML model 102, ML model 202 is configured to generate, at output data store 208, a representation of an ear-wearable device for a target ear canal of a user. ML model 202 is configured to generate representations or ear-wearable devices that mimic finished, ear-wearable devices produced by highly-skilled operators at manufacturing facilities, clinics, and other retail facilities. That is, ML model 202 is trained to produce representations of ear-wearable devices that have a shape and configuration that is as close as possible to a shape and configuration of ear-wearable devices that have been physically modified by highly skilled operators at manufacturing, clinician, or retail facilities.

Training module 226 trains ML model 202 to receive input data from input data store 206 and, in response, provide output data at output data store 208. The input data can include different types, forms, or variations of input data.

During training, training module 226 may intentionally deform example input data or desired output data stored at training data store 204 in any number of ways to increase model robustness, generalization, or other qualities. Example techniques to deform training data include adding noise; changing color, shade, or hue; magnification; segmentation; amplification; etc.

Training module 226 may train ML model 202 in an offline fashion or an online fashion. In offline training (also known as batch learning), training module 226 trains ML model 202 on the entirety of a static set of training data. In online learning, training module 226 trains ML model 202 continuously (or re-trained) as new training data becomes available (e.g., based on feedback from users).

Training module 226 may train ML model 202 according to one or more of various different training types or techniques. For example, in some implementations, training module 226 may train ML model 202 using supervised learning, in which ML model 202 is trained on a training dataset that includes instances or examples that have labels. The labels can be manually applied by experts, generated through crowd-sourcing, or provided by other techniques (e.g., by physics-based or complex mathematical models). In some implementations, this process can be referred to as personalizing the model.

Training module 226 may train ML model 202 by optimizing an objective function. For example, in some implementations, the objective function may be or include a loss function that compares (e.g., determines a difference between) output data generated by ML model 202 from the training data and labels (e.g., ground-truth labels) associated with the training data. For example, the loss function can evaluate a sum or mean of squared differences between the output data and the labels. In some examples, the objective function may be or include a cost function that describes a cost of a certain outcome or output data. Other examples of the objective function can include margin-based techniques such as, for example, triplet loss or maximum-margin training.

Training module 226 may perform various optimization techniques to optimize an objective function. For example, the optimization technique(s) can minimize or maximize the objective function. Example optimization techniques include Hessian-based techniques and gradient-based techniques, such as, for example, coordinate descent; gradient descent (e.g., stochastic gradient descent); sub gradient methods; etc. Other optimization techniques include black box optimization techniques and heuristics.

Training module 226 may perform backward propagation of errors into ML model 202 that may be used in conjunction with an optimization technique (e.g., gradient based techniques) to train ML model 202 (e.g., when machine-learned model 202 is a multi-layer model such as an artificial neural network). For example, an iterative cycle of propagation and model parameter (e.g., weights) update can be performed to train ML model 202. Example backpropagation techniques include truncated backpropagation through time, Levenberg-Marquardt backpropagation, etc.

Training module 226 may train ML model 202 using unsupervised learning techniques. Unsupervised learning can include inferring a function to describe hidden structure from unlabeled data. For example, a classification or categorization may not be included in the data.

Training module 226 may train ML model 202 using semi-supervised techniques which combine aspects of supervised learning and unsupervised learning. Training module 226 may train ML model 202 through evolutionary techniques or genetic algorithms. Training module 226 may train ML model 202 using reinforcement learning. In reinforcement learning, an agent (e.g., model) can take actions in an environment and learn to maximize rewards and/or minimize penalties that result from such actions. Reinforcement learning can differ from the supervised learning problem in that correct input/output pairs are not presented, nor sub-optimal actions explicitly corrected.

Training module 226 may train ML model 202 using one or more generalization techniques to improve the generalization of ML model 202. Generalization techniques may prevent overfitting of ML model 202 to the training data. Example generalization techniques include dropout techniques; weight decay techniques; batch normalization; early stopping; subset selection; stepwise selection; etc.

ML model 202 can be or include one or more of various different types of machine-learned models. One or more of the example models described below can be used (e.g., combined) to provide the output data in response to the input data. Additional models beyond the example models provided below can be used as well.

In some implementations, ML model 202 can be a parametric model while, in other implementations, ML model 202 can be a non-parametric model. For example, as a parametric based model, ML model 202 may determine a parametric representation for an ear-wearable device that is divided into multiple cross sections. ML model 202 may determine a set of parameters characterizing a cylindrical shape that defines the ear-wearable device and then estimates those parameters for a given representation of a target ear canal. Whereas, as a non-parametric model, such as a neural network, ML model 202 determines an inherent structure associated with an ear-wearable device and predicts the ear-wearable device structure for a given target ear canal.

In some examples, ML model 202 may be a linear model while, in other implementations, ML model 202 can be a non-linear model. In some implementations, ML model 202 can be or can include one or more classifier models such as, for example, linear classification models, quadratic classification models, etc. ML model 202 may be or may include one or more regression models such as, for example, simple linear regression models, multiple linear regression models, logistic regression models, stepwise regression models, multivariate adaptive regression splines, locally estimated scatterplot smoothing models, etc. In some examples, ML model 202 can be or can include one or more decision tree-based models such as, for example, classification and/or regression trees, iterative dichotomiser 3 decision trees, C4.5 decision trees, chi-squared automatic interaction detection decision trees, decision stumps, conditional decision trees, etc.

ML model 202 may include one or more instance-based learning models such as, for example, learning vector quantization models, self-organizing map models, locally weighted learning models, etc. In some implementations, ML model 202 can be or can include one or more nearest neighbor models such as, for example, k-nearest neighbor classifications models; k-nearest neighbors regression models, etc. ML model 202 can be or include one or more Bayesian models such as, for example, naïve Bayes models, Gaussian naïve Bayes models; multinomial naïve Bayes models, averaged one-dependence estimators, Bayesian networks; Bayesian belief networks, hidden Markov models; etc.

In some example, ML model 202 may include one or more artificial neural networks (also referred to simply as neural networks). A neural network can include a group of connected nodes, which also can be referred to as neurons or perceptrons. A neural network can be organized into one or more layers. Neural networks that include multiple layers can be referred to as "deep" networks. A deep network can include an input layer, an output layer, and one or more hidden layers positioned between the input layer and the output layer. The nodes of the neural network can be connected or non-fully connected.

ML model 202 can be or include one or more feed forward neural networks. In feed forward networks, the connections between nodes do not form a cycle. For example, each connection can connect a node from an earlier layer to a node from a later layer.

In some examples, ML model 202 may include one or more recurrent neural networks. In some instances, at least some of the nodes of a recurrent neural network can form a cycle. Example recurrent neural networks include long short-term (LSTM) recurrent neural networks; gated recurrent units; bi-direction recurrent neural networks; continuous time recurrent neural networks; neural history compressors; echo state networks; Elman networks; Jordan networks; recursive neural networks; Hopfield networks; fully recurrent networks; sequence-to-sequence configurations; etc.

ML model 202 may be or may include one or more convolutional neural networks. In some instances, a convolutional neural network can include one or more convolutional layers that perform convolutions over input data using learned filters. Filters can also be referred to as kernels.

In some examples, ML model 202 can be or include one or more generative networks such as, for example, generative adversarial networks. Generative networks can be used to generate new data such as new images or other content.

ML model 202 may be or may include one or more other forms of artificial neural networks such as, for example, deep Boltzmann machines; deep belief networks; stacked autoencoders; etc. Any of the neural networks described herein can be combined (e.g., stacked) to form more complex networks.

ML model 202 may include one or more clustering models such as, for example, k-means clustering models; k-medians clustering models; expectation maximization models; hierarchical clustering models; etc.

ML model 202 may receive and use input data in its raw form whereas in other cases, the raw input data may be preprocessed. For example, preprocessing the input data can include extracting one or more additional features from the raw input data.

Feature extraction techniques can be applied to the input data to generate one or more new, additional features. Example feature extraction techniques include edge detection; corner detection; blob detection; ridge detection; scale-invariant feature transform; motion detection; optical flow; Hough transform; etc. The extracted features may include or be derived from transformations of the input data into other domains and/or dimensions. As an example, the extracted features can include or be derived from transformations of the input data into the frequency domain. For example, wavelet transformations and/or Fourier transforms can be performed on the input data to generate additional features. In some examples, the extracted features may include statistics calculated from the input data or certain portions or dimensions of the input data. Example statistics include the mode, mean, maximum, minimum, or other metrics of the input data or portions thereof.

As another example preprocessing technique, portions of the input data can be imputed. For example, additional synthetic input data can be generated through interpolation and/or extrapolation.

As another example preprocessing technique, some or all of the input data can be scaled, standardized, normalized, generalized, and/or regularized. Example regularization techniques include ridge regression; least absolute shrinkage and selection operator (LASSO); elastic net; least-angle regression; cross-validation; L1 regularization; L2 regularization; etc. As one example, some or all of the input data can be normalized by subtracting the mean across a given dimension's feature values from each individual feature value and then dividing by the standard deviation or other metric.

As another example preprocessing technique, some or all of the input data can be quantized or discretized. In some cases, qualitative features or variables included in the input data can be converted to quantitative features or variables.

Figure 3A:
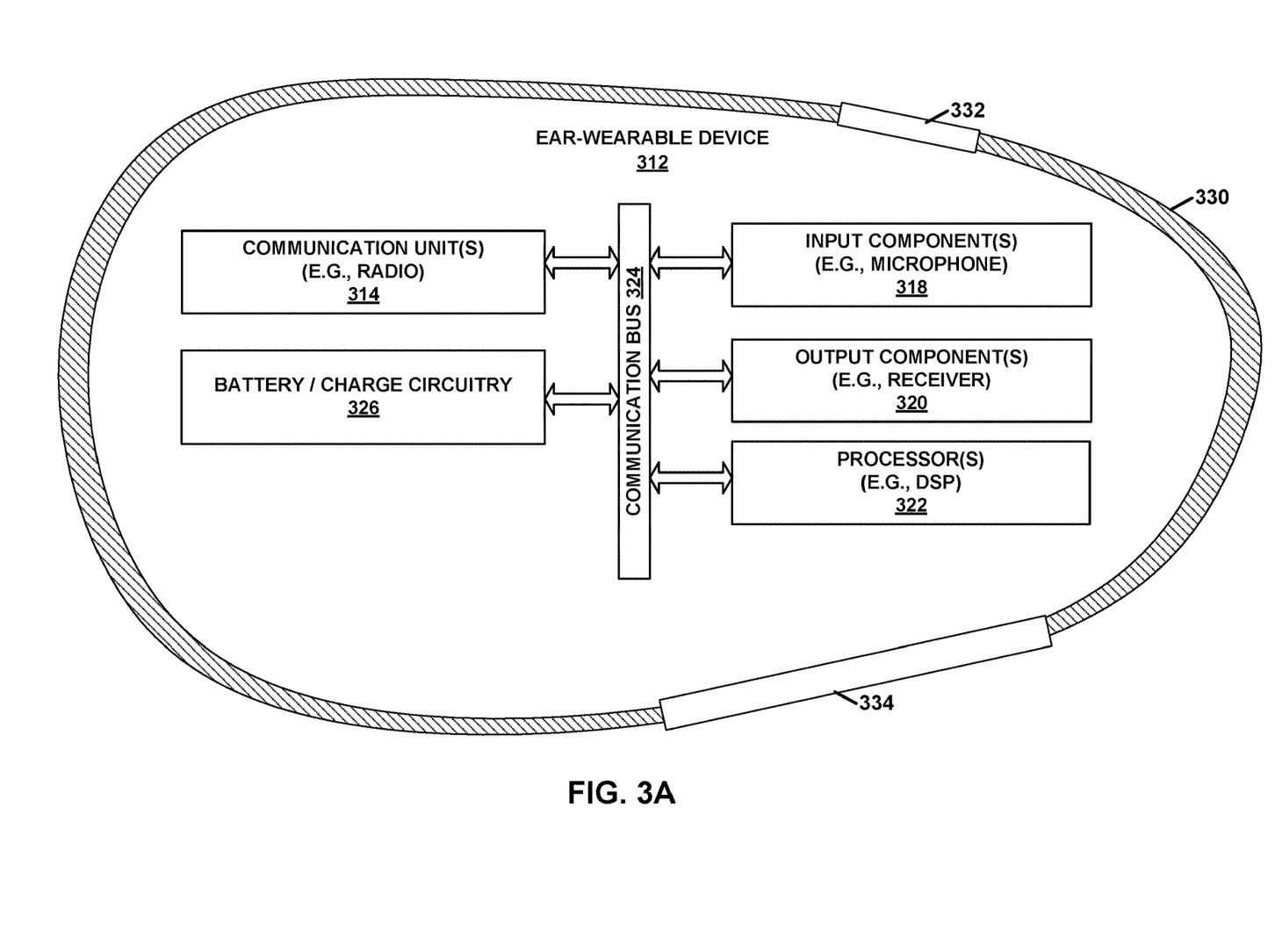
FIG. 3A is a block diagram illustrating an example ear-wearable device modeled by an example machine-learned model, in accordance with one or more aspects of the present disclosure.

FIG. 3A is a block diagram illustrating an example ear-wearable device modeled by an example machine-learned model, in accordance with one or more aspects of the present disclosure. Ear-wearable device 312 may be any type of ear-wearable device configured to provide sound for hearing. Ear-wearable device 312 is a device designed to be worn on or in a user's ear.

Ear-wearable device 312 includes one or more communication units 314, one or more input components 318, one or more output components 320, one or more processors 322, battery/charge circuitry 326, that are operatively or communicatively coupled via communication bus 324. Each of the aforementioned components of ear-wearable device 312 are shown housed within outer shell 330, including within shell 330, vent 332 and access panel 334.

Similar to communication units 214 of FIG. 2, communication units 314 may include a radio or other component that enables ear-wearable device 312 to communicate data with other devices. For example, communication units 314 may enable ear-wearable device to exchange data with another ear-wearable device (e.g., for a user with bi-lateral hearing loss, for a set of stereo headphones, etc.). Likewise, communication units 314 may enable ear-wearable device to exchange data with a programmer, a mobile phone, or other external device.

Battery/charge circuitry 326 of ear-wearable device 312 powers the various components of ear-wearable device 312, to enable ear-wearable device 312 to provide sound. Similar to processors 222 of FIG. 2, processors 322 may perform operations that enable ear-wearable device 312 to perform a function or take a particular action. As one example, processors 322 may include a digital signal processor or other processing circuitry that controls the various components of ear-wearable device 312 to provide sound for hearing.

Ear-wearable device 312 includes one or more input components 318 and one or more output components 320. Input components 318 may include a microphone configured to detect audible sounds in a listening area of a user and output components 320 may include a receiver (e.g., a speaker) configured to generate sound, e.g., based on the detected audible sounds, for hearing.

Vent 332 of ear-wearable device 312 provides a conduit from which sound can enter and exit shell 330. For example, a microphone of input components 318 may be configured to receive sound waves via vent 332 and a receiver of output components 320 may be configured to output sound waves via vent 332. Vent 332 may have a particular shape and/or size that is designed specifically for adapting shell 330 to input and output sound.

Access panel 334 of ear-wearable device 312 provides a way for a user to access internal cavity 332 of ear-wearable device 312, for example, to replace battery/charge circuitry 326, or access other components of ear-wearable device 312. Access panel 334 may be a door, a window, or other removable cover.

A set of empirical modelling guidelines known to ear-wearable device manufacturers may specify a preferred layout for each of the components of ear-wearable device 332. For instance, the guidelines may define a minimum thickness for shell 330. The guidelines may further specify a position for access panel 334 relative to other components of ear-wearable device 332. Likewise, the set of empirical modeling guidelines may define a minimum separation distance from various components of ear-wearable device 312 and from shell 330, for instance, by specifying that a receiver of output components 320 should not contact or be within a minimum distance threshold of shell 330. Other design considerations and guidelines may be followed. These empirical modeling guidelines may be quantified and used, with reference to FIG. 1, as training data 104 or input data 106.

Figure 3B:
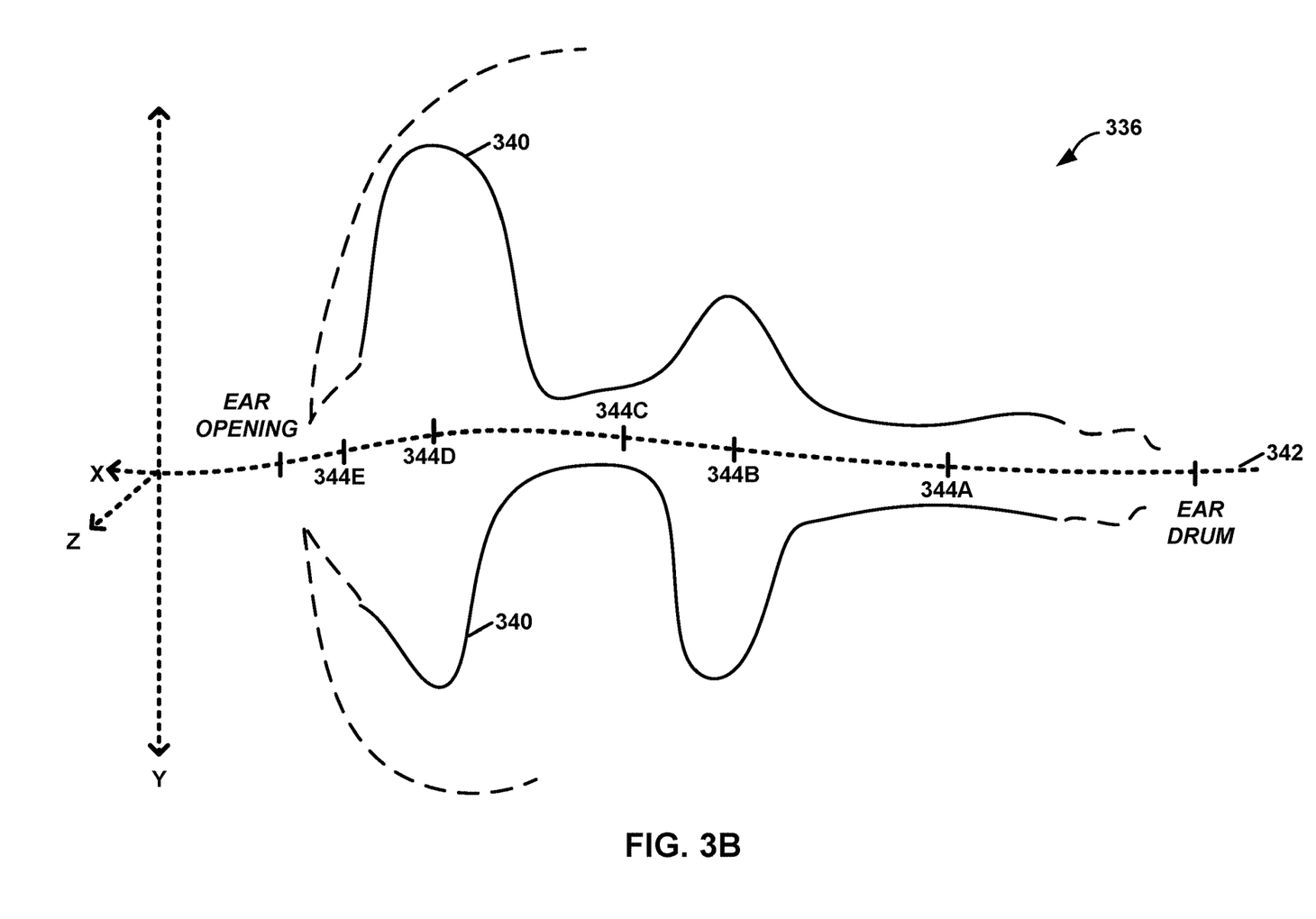
FIG. 3B is a conceptual diagram illustrating a cross-sectional view of a representation of a target ear canal including positions along an axis protruding through the target ear canal, in accordance with one or more aspects of the present disclosure.

FIG. 3B is a conceptual diagram illustrating a cross-sectional view of a representation of a target ear canal including positions along an axis protruding through the target ear canal, in accordance with one or more aspects of the present disclosure. FIG. 3B is described in the context of computing device 212 of FIG. 2. For example, ML model 202 of computing device 212 may receive as input, representation 336 as a series of three-dimensional points that define a user's ear canal, shown as target ear-canal 340, and generate a representation of an ear-wearable device for target ear-canal 340, in accordance with techniques of this disclosure.

Representation 336 of target ear-canal 340 includes an ear opening at one end, and an ear-drum at an opposite end. Representation 336 of target ear canal 340 is defined in part by axis 342 protruding from the ear drum located at one end of target ear canal 340 to an opposite end of target ear canal 340.

ML model 202 may define axis 342 to include a plurality of positions 344A through 344E protruding from the ear drum of target ear-canal 340 to the ear-opening located at the opposite end of target ear-canal 340. Position 344E is shown being nearest to the ear opening and furthest from the ear drum, and position 344A is shown being nearest to the ear drum and furthest from the ear opening. ML model 202 may generate a representation of an ear-wearable device to minimize errors in the representation of the ear-wearable device, where the errors are a function of position and curvature along axis 342.

For example, training module 226 of computing device 212 may determine a deviation between a desired output from ML model 202 and an actual output from ML model 202. Training module 226 may cause ML model 202 to apply more emphasis on fixing certain deviations more so than others. For example, training module 226 may cause ML model 202 to apply higher weights to ensuring a representation of an ear-wearable device is most accurate in certain areas along axis 342 and in some examples, ML model 202 may apply lower weights to other along axis 342 that may be less crucial to ensuring usability and user-comfort.

For example, positions 344D and 344B are located at areas of ear canal 340 that have a large amount of curvature above and below axis 342 as compared to positions 344A, 344C, and 344E where ear canal 340 appears to have a lesser amount of curvature above and below axis 342. User discomfort may occur around positions 344D and 344B, more so than positions 344A, 344C, and 344E, for example, if a shell of an ear-wearable device is mis-shaped and not appropriately contoured to fit inside the curvature in these areas.

Training module 226 may apply a respective weighting to positions 344A through 344E along axis 342. The respective weighting of each of the different positions 344A through 344E may be a function of an amount of curvature at that position. ML model 202 may shape portions of a shell of an ear-wearable device, to be more accurate for target ear canal 340, at positions along axis 342 with greater respective weightings than other positions along axis 342 with lower respective weightings.

For example, training module 226 may determine a deviation in the shape of an ear-wearable device as compared to a desired or expected shape. Training module 226 may apply weights to more important areas of an ear-wearable device shell where the deviations occur. Training module 226 may apply weights to cause ML model 202 to emphasize reducing error in shell-shape at positions 344D and 344B over reducing error in shell-shape at other positions 344A, 344C, and 344E. Training module 226 may increase the respective weighting of positions 344B and 344D that have a greater amount of curvature and may decrease the respective weighting of positions 344A, 344C, and 344E that have a lesser amount of curvature.

Figure 4:
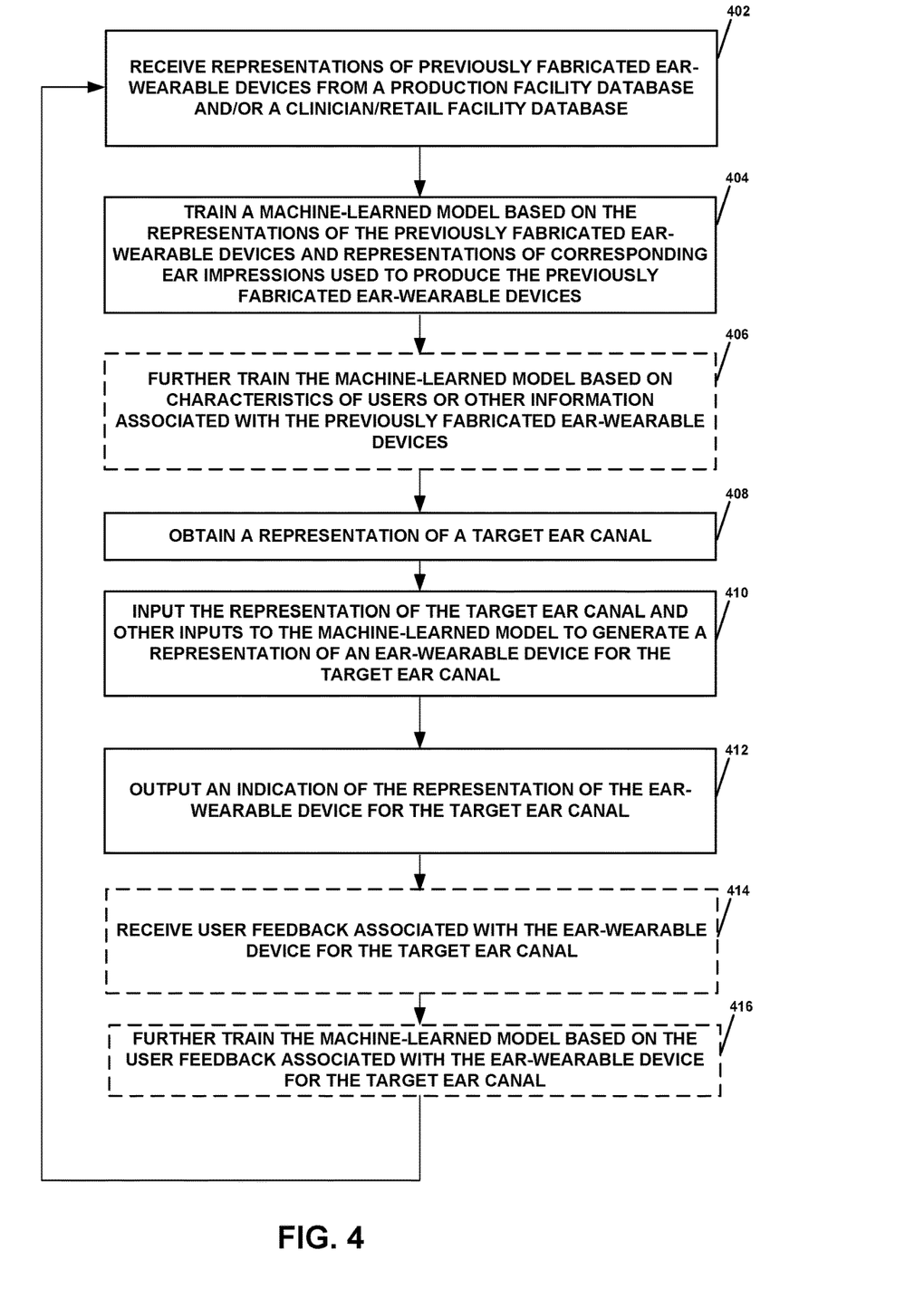
FIG. 4 is a flow chart illustrating operations performed by an example machine-learning system, in accordance with one or more aspects of the present disclosure.

FIG. 4 is a flow chart illustrating operations performed by an example machine-learning system, in accordance with one or more aspects of the present disclosure. FIG. 4 is described below in the context of computing device 212 of FIG. 2. Computing device 212 may execute operations 402-416 in a different order than that shown in FIG. 4. Computing device 212 may perform additional or fewer operations than those shown in FIG. 4.

In operation, computing device 212 may receive representations of previously fabricated ear-wearable devices from a production facility database and/or a clinician/retail facility database (402). For example, training module 226 of computing device 212 may communicate, using communication units 214, with remote computing devices that maintain databases or other records of previously fabricated ear-wearable devices. Training module 226 may receive, from a production facility database or a clinician or retail facility database, data including representations of previously fabricated ear-wearable devices, in their finished form and based on the production data, create training data to train ML model 202 to replicate ear-wearable devices that have similar characteristics of the previously fabricated ear-wearable devices. In addition, or alternatively, training module 226 may receive, from a clinician or retail facility database, other data including representations of previously fabricated ear-wearable devices and based on the clinician or retail data, create training data to train ML model 202 to replicate ear-wearable devices that have similar characteristics of the previously fabricated ear-wearable devices.

Computing device 212 may train a ML model based on the representations of the previously fabricated ear-wearable devices and representations of corresponding ear impressions used to produce the previously fabricated ear-wearable devices (404). For example, the desired output or the training target of ML model 202 may be a set of three-dimensional points or Fourier transform thereof, that define a final ear-wearable device shell, for a target ear canal impression. A cost function used by training module 226 for training ML model 202 may indicate a deviation (e.g., a weighted mean square error) between the output from ML model 202 and the desired output. The actual weights applied to the deviations associated with different parts of the ear-wearable device shell may be a function of shell curvature and relative location when the ear-wearable device is positioned inside the target ear canal (e.g., to focus ML model 202 on generating an ear-wearable shell design that is comfortable to wear). Training module 226 may utilize a backpropagation algorithm to further train ML model 202.

With access to records of previously fabricated ear-wearable devices produced at a production facility and/or at a clinic or retail facility, training module 226 can train ML model 202 to mimic ear-wearable shell designs at any stage in a product's lifecycle, including during production and customer delivery. For example, in addition to causing ML model 202 to learn what skilled modelers do in production, training module 226 may input training data derived from clinics to cause ML model 202 to learn and mimic not only what modelers do in production but also what professionals do in a clinic. In other words, instead of using a final shell design in production as a training target, training module 226 may use a final shell design as modified by a clinician as the training target.

In some examples, computing device 212 may further train the ML model based on characteristics of users or other information associated with the previously fabricated ear-wearable devices (406). For example, training module 226 may tailor the training of ML model 202 to various other conditions that may affect ear-wearable shell design, shape, and preferences. For example, training module 226 may use a particular set of training data (e.g., in training data store 204) that is associated with a specific country, a specific region or even a specific clinic instead of training ML model 202 to be generally configured for an entire population of users. Said differently, users of a particular country, region, clinic, or other demographic may have particular preferences; training module 226 may train ML model 202 to generate representations of ear-wearable devices that accommodate those preferences.

Computing device 212 may obtain a representation of a target ear canal (408). For example, UI module 228 may receive a scan of an end-user's ear canal and provide the scan (or Fourier transform thereof) as an input to ML model 202.

Computing device 212 may input the representation of the target ear canal and any other related inputs to the ML model to generate a representation of an ear-wearable device for the target ear canal (410). For example, UI module 228 may receive other user inputs that specify a geographic region, body type, skin type, or other characteristic associated with a user or an ordering clinic that specify preferences for the ear-wearable device design. UI module 228 may format and send to ML model 202 the various inputs, including the representation of the target ear canal.

Computing device 212 may output an indication of a representation of an ear-wearable device for the target ear canal (412). For example, ML model 202 may output data indicative of a shape and configuration of an ear-wearable device. In some examples, the output of ML model 202 may define a set of points, or Fourier transform thereof, that define an exterior shell of an ear-wearable device. The output of ML model 202 may specify locations of various internal components within the exterior shell.

Computing device 212 may receive user feedback associated with the ear-wearable device for the target ear canal (414). For example, a skilled modeler may make improvements or modifications to a finally, assembled ear-wearable device that is based on the output from ML model 202. Any tweaks or modifications made by the modeler may be determined by UI module 228 and sent to training module 226.

Computing device 212 may train the ML model based on the user feedback associated with the ear-wearable device for the target ear canal (416). For example, training module 226 may input a representation of modifications made to an output from ML model 202 to cause ML model 202 to learn and anticipate the modifications when generating future ear-wearable device designs. ML model 202 may in some cases be continuously trained and improved as additional training data and shell modeling guidelines evolve, for instance, as new ear-wearable device technology and designs continue to evolve.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection may be considered a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transitory, tangible storage media. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   obtaining, by at least one processor, a representation of a target ear canal of a user, wherein the representation of the target ear canal is defined in part by an axis protruding from an ear drum located at one end of the target ear canal to an opposite end of the target ear canal; and
   generating, using a machine-learned model that has been trained based at least in part on representations of previously fabricated ear-wearable devices, a representation of an ear-wearable device for the target ear canal, wherein generating the representation of the ear-wearable device comprises applying, by the machine-learned model, a respective weighting to different positions along the axis, wherein:
      the respective weighting of each of the different positions is a function of an amount of curvature at that position; and
      portions of the representation of the ear-wearable device associated with positions along the axis with greater respective weightings more closely conform to the representation of the target ear canal than other portions of the representation of the ear-wearable device associated with positions along the axis with lower respective weightings.

2. The method of claim 1, further comprising:
   training the machine-learned model based on the representations of previously fabricated ear-wearable devices and representations of corresponding ear impressions used to produce the previously fabricated ear-wearable devices.

3. The method of claim 2, further comprising at least one of:
   receiving, from a production facility database, the representations of the previously fabricated ear-wearable devices; or
   receiving, from a clinician or retail facility database, the representations of the previously fabricated ear-wearable devices.

4. The method of claim 1, further comprising:
   training the machine-learned model based on characteristics of corresponding users associated with the previously fabricated ear-wearable devices, the characteristics of the corresponding users comprising one or more of: age, gender, national origin, geographic location, ear type, ear shape, or ear size.

5. The method of claim 1, further comprising:
retraining the machine-learned model based on user modifications to the representation of the ear-wearable device for the target ear canal.

6. The method of claim 1, wherein generating the representation of the ear-wearable device comprises:
after training the machine-learned model, inputting, to the machine-learned model, one or more of:
the representation of the target ear canal;
an indication of a particular type of ear-wearable device;
respective representations of each internal component of the ear-wearable device;
or
an indication of one or more modeling constraints.

7. The method of claim 6, wherein the representation of the target ear canal comprises a three-dimensional representation of the target ear canal or a Fourier transform of the three-dimensional representation of the target ear canal.

8. The method of claim 6, wherein the indication of the particular type of ear-wearable device indicates whether the ear-wearable device comprises an in-the-ear type of hearing aid, an in-the-canal type of hearing aid, a half shell type of hearing aid, a completely-in-the-canal type hearing aid, or an invisible-in-the-canal type hearing aid.

9. The method of claim 6, wherein the respective representation of each internal component of the ear-wearable device comprises a three-dimensional representation of that internal component or a Fourier transform of the three-dimensional representation of that internal component.

10. The method of claim 6, wherein the indication of one or more modeling constraints comprises one or more of:
limitations on relative positioning between two or more of the internal components;
limitations on positions of one or more of the internal components relative to an access panel of the ear-wearable device;
limitations on positions of one or more of the internal components relative to an outer shell of the ear-wearable device;
limitations on a thickness of the outer shell of the ear-wearable device; or
characteristics of a vent of the ear-wearable device.

11. The method of claim 1, wherein applying the respective weighting to the different positions along the axis comprises increasing the respective weighting of the different positions that have a greater amount of curvature and decreasing the respective weighting of the different positions that have a lesser amount of curvature.

12. A non-transitory computer-readable storage medium comprising instructions that when executed by at least one processor, cause the at least one processor to:
obtain a representation of a target ear canal of a user, wherein the representation of the target ear canal is defined in part by an axis protruding from an ear drum located at one end of the target ear canal to an opposite end of the target ear canal; and
generate, using a machine-learned model that has been trained based at least in part on representations of previously fabricated ear-wearable devices, a representation of an ear-wearable device for the target ear canal, wherein the instructions that cause the at least one processor to generate the representation of the ear-wearable device comprise instructions that, when executed, cause the at least one processor to apply, by the machine-learned model, a respective weighting to different positions along the axis, wherein:
the respective weighting of each of the different positions is a function of an amount of curvature at that position; and
portions of the representation of the ear-wearable device associated with positions along the axis with greater respective weightings more closely conform to the representation of the target ear canal than other portions of the representation of the ear-wearable device associated with positions along the axis with lower respective weighting.

13. The non-transitory computer-readable storage medium of claim 12, wherein execution of the instructions further causes the at least one processor to:
train the machine-learned model based on the representations of previously fabricated ear-wearable devices and representations of corresponding ear impressions used to produce the previously fabricated ear-wearable devices.

14. The non-transitory computer-readable storage medium of claim 13, wherein execution of the instructions further causes the at least one processor to:
receive, from a production facility database, the representations of the previously fabricated ear-wearable devices; or
receive, from a clinician or retail facility database, the representations of the previously fabricated ear-wearable devices.

15. The non-transitory computer-readable storage medium of claim 12, wherein execution of the instructions further causes the at least one processor to:
train the machine-learned model based on characteristics of corresponding users associated with the previously fabricated ear-wearable devices, the characteristics of the corresponding users comprising one or more of: age, gender, national origin, geographic location, ear type, ear shape, or ear size.

16. The non-transitory computer-readable storage medium of claim 12, wherein execution of the instructions further causes the at least one processor to:
retrain the machine-learned model based on user modifications to the representation of the ear-wearable device for the target ear canal.

17. The non-transitory computer-readable storage medium of claim 12, wherein as part of causing the at least one processor to generate the representation of the ear-wearable device, execution of the instructions causes the at least one processor to:
after training the machine-learned model, input, to the machine-learned model, one or more of:
the representation of the target ear canal;
an indication of a particular type of ear-wearable device;
respective representations of each internal component of the ear-wearable device;
or
an indication of one or more modeling constraints.

18. The non-transitory computer-readable storage medium of claim 17, wherein the representation of the target ear canal comprises a three-dimensional representation of the target ear canal or a Fourier transform of the three-dimensional representation of the target ear canal.

19. The non-transitory computer-readable storage medium of claim 17, wherein the indication of the particular type of ear-wearable device indicates whether the ear-wearable device comprises an in-the-ear type of hearing aid, an in-the-canal type of hearing aid, a half shell type of hearing aid, a completely-in-the-canal type hearing aid, or an invisible-in-the-canal type hearing aid.

20. The non-transitory computer-readable storage medium of claim 17, wherein the respective representation of each internal component of the ear-wearable device comprises a three-dimensional representation of that internal component or a Fourier transform of the three-dimensional representation of that internal component.

21. The non-transitory computer-readable storage medium of claim 17, wherein the indication of one or more modeling constraints comprises one or more of:
   limitations on relative positioning between two or more of the internal components;
   limitations on positions of one or more of the internal components relative to an access panel of the ear-wearable device;
   limitations on positions of one or more of the internal components relative to an outer shell of the ear-wearable device;
   limitations on a thickness of the outer shell of the ear-wearable device; or
   characteristics of a vent of the ear-wearable device.

22. The non-transitory computer-readable storage medium of claim 12, wherein as part of causing the at least one processor to apply the respective weighting to the different positions along the axis, execution of the instructions causes the at least one processor to increase the respective weighting of the different positions that have a greater amount of curvature and decrease the respective weighting of the different positions that have a lesser amount of curvature.

23. A computing device comprising:
   one or more data storage devices configured to store a machine-learned model that has been trained based at least in part on representations of previously fabricated ear-wearable devices; and
   at least one processor, wherein the at least one processor is configured to:
      obtain a representation of a target ear canal of a user, wherein the representation of the target ear canal is defined in part by an axis protruding from an ear drum located at one end of the target ear canal to an opposite end of the target ear canal; and
      generate, using the machine-learned model, a representation of an ear-wearable device for the target ear canal, wherein the machine-learned model comprises a deep-neural network including multiple layers, wherein the at least one processor is configured such that, as part of causing the at least one processor to generate the representation of the ear-wearable device, the at least one processor applies, using the machine-learned model, a respective weighting to different positions along the axis, wherein:
      the respective weighting of each of the different positions is a function of an amount of curvature at that position; and
      portions of the representation of the ear-wearable device associated with positions along the axis with greater respective weightings more closely conform to the representation of the target ear canal than other portions of the representation of the ear-wearable device associated with positions along the axis with lower respective weightings.

* * * * *